March 26, 1968 A. L. ROSSOFF ET AL 3,375,353

STEREOGRAPHIC RADAR SYSTEM

Original Filed Feb. 26, 1962

INVENTORS
ARTHUR L. ROSSOFF
HOWARD E. LUSTIG

BY James and Franklin

ATTORNEYS

March 26, 1968    A. L. ROSSOFF ET AL    3,375,353
STEREOGRAPHIC RADAR SYSTEM
Original Filed Feb. 26, 1962    4 Sheets-Sheet 2

INVENTORS
ARTHUR L. ROSSOFF
HOWARD E. LUSTIG
BY
James and Franklin
ATTORNEYS

United States Patent Office 3,375,353
Patented Mar. 26, 1968

3,375,353
STEREOGRAPHIC RADAR SYSTEM
Arthur L. Rossoff, Huntington Station, and Howard E. Lustig, Flushing, N.Y., assignors to General Instrument Corporation, Newark, N.J., a corporation of New Jersey
Continuation of application Ser. No. 175,701, Feb. 26, 1962. This application July 24, 1967, Ser. No. 655,674
8 Claims. (Cl. 235—151)

This invention relates to a technique whereby a single airborne radar, with a single search operation, may be used to obtain stereoscopic data with any desired degree of enhancement of the three-dimensional effect, thereby producing a three-dimensional target representation from a single radiation detector.

This application is a continuation of application Ser. No. 175,701, which was filed Feb. 26, 1962 (now abandoned).

There exist today two conventional methods for generating a PPI radar display from an airborne search radar. The first of these results in a slant range display. A fan shaped search radar beam is used, and linear sweep is used for the display. As a consequence, each target is displayed at a distance from the sweep origin which is proportional to its slant range from the aircraft. The point on the ground directly below the aircraft, assumed to be the point having the nearest slant range, is mapped at the same distance from the sweep origin along all azimuths. As a result, the familiar "altitude hole" is formed.

It is clear that this type of display results in a distortion compared to a topographic map representation of the same targets. This distortion depends upon the particular geometric target-aircraft relationship for each target. An attempt to remedy the situation results in the so-called ground range display. Here the sweep is both delayed and purposely made non-linear with time. The initial delay results in the mapping of the point directly below the aircraft at the origin of the display sweep and thus eliminates the altitude hole. Proper compensation depends on the use of a particular altitude above a reference ground plane. Ground range mapping will be correct only for those points where the vertical aircraft-terrain separation corresponds accurately at all times to that particular altitude. Even the ground range display does not give a true topographic map presentation except in the idealized condition where all targets are at essentially the same elevation. The inability of present ground range display systems to generate a non-linear sweep, always in accordance with the then existing altitude, with errors less than approximately one percent, further limits ground range display systems from having the utility and accuracy necessary for mapping purposes.

Both the slant range and ground range displays have an additional shortcoming in that they display exclusively on the basis of target distance, and hence cannot distinguish between two targets at different ground range and elevations but which nevertheless have the same slant range from the radar.

It is a well-known fact that aerial photography, through the use of stereoscopic techniques, can be utilized for extremely accurate terrain mapping in terms of true ground ranges, and for precise elevation determination as well. Aerial photography, on the other hand, suffers from the obvious lack of an all-weather capability. It is apparent that a radar system which could combine the all-weather capability with a preservation of the angular relationships of aerial photography, and which could, subsequently, result in stereoscopic display, would represent a clear advance in terms of military capabilities.

This combination can, in accordance with the present invention, be derived through the use of a single radar, which does not use the fan-shaped beam previously employed for search purposes but rather uses a narrow pencil beam. Numerous fire control and tracking radars either use a pencil beam, or else achieve a pencil beam effect by means of separate azimuth and elevation scanning techniques. In these systems it is always possible to define the target direction in terms of two linear or angular measurements. In addition, of course, the range to the target is inherent in the radar return. As a result, the necessary basis for three-dimensional display exists. There is, in fact, more dimensional information contained in such a radar return than is exhibited by a single aerial photograph, to wit, information concerning target range.

Two aerial photographs taken from two separate locations, but having an overlap area in common, form a stereo pair from which detailed location and elevation information may be derived. Similarly, two radar displays, each of which preserves only the linear or angular measurements as does each aerial photograph, could be used to establish stereoscopic data. Similar target location and elevation information could then be derived from the radar stereo pair.

Significantly, because radar range information is available in radar returns in addition to direction data, stereoscopic displays may be derived with only a single look by the radar system, obviating the need for two distinct and separate observations. With the system here disclosed, a single radar is used to scan the terrain within its search range. With this single radar system the direction of incidence of returns can be determined, either in terms of two angular quantities such as azimuth angle and depression angle, or in terms of two scalar quantities such as $x$ and $y$, which represent the coordinates of the target projection along the line of sight from the aircraft into an arbitrary horizontal reference plane, and in addition range to the target is available. From this information representing a "look" from the actual aircraft location, a synthetic signal may be derived representing what a radar would "see" if it looked at the same target from a different location, suitably chosen to give the desired stereoscopic effect. The equipment operator may select and simulate this latter location with a high degree of freedom. The real and synthetic signals can then be combined stereoscopically. Such a stereoscopic display can be obtained for all weather conditions permitted by the radar system frequency, power, and resolution.

The computations involved in producing the synthetic radar signal, corresponding to what a radar would "see" if it were in a known location spaced from that of the actual radar, can readily be carried out with acceptable speed and accuracy in accordance with the methods and apparatus here disclosed. Several methods are set forth, providing varying degrees of flexibility in selecting the hypothetical position of the synthetic radar.

To the accomplishment of the above, and to such other objects as may hereinafter appear, the present invention relates to methods and apparatus for producing a three-dimensional target representation from a single radiation detector, as defined in the appended claims and as described in this specification, taken together with the accompanying drawings, in which:

Figures 1, 2:
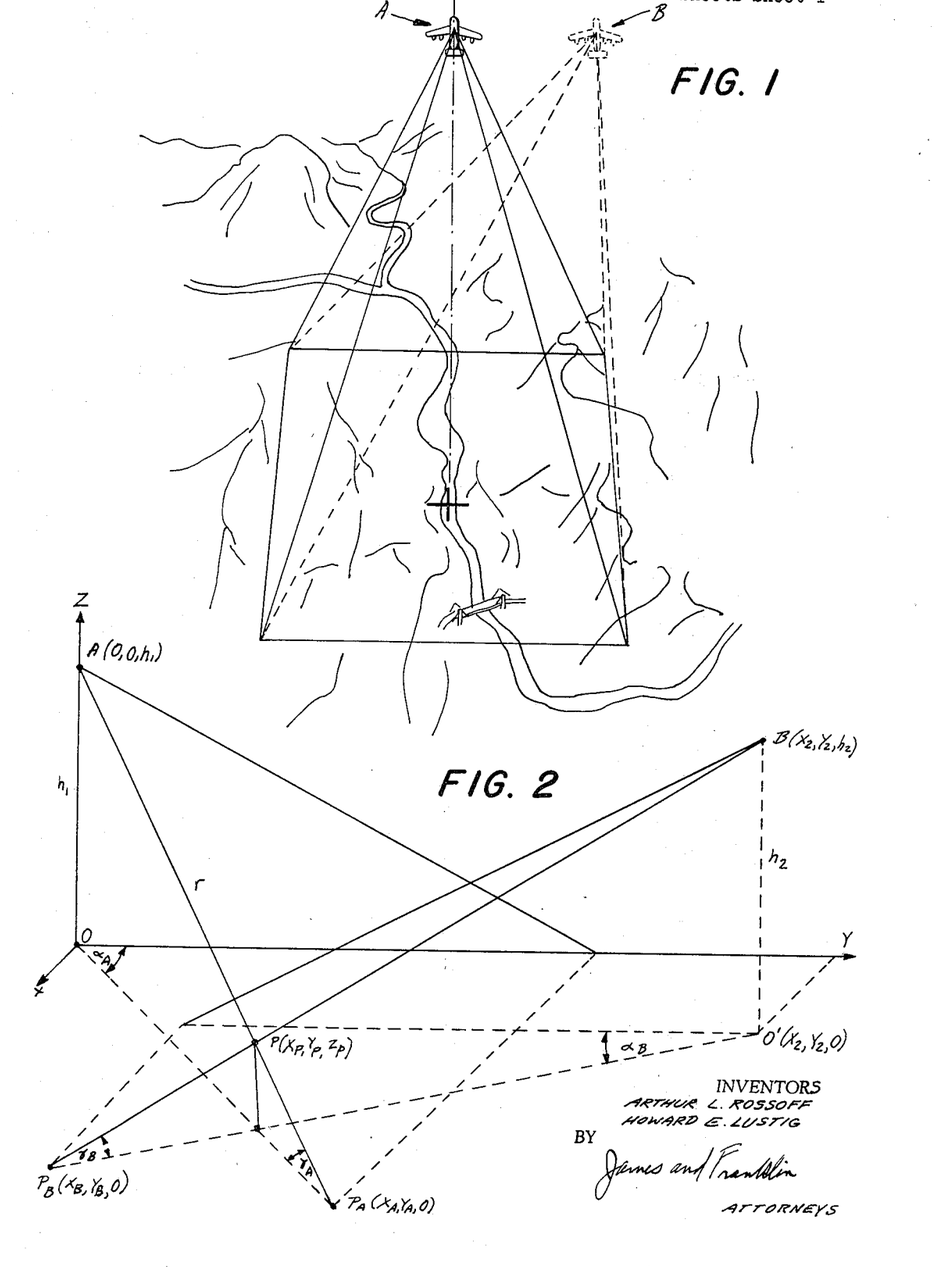
FIG. 1 is a pictorial representation of the use of the present invention in the radar mapping of terrain from an overflying aircraft.
FIG. 2 is a diagrammatic representation of an instantaneous mapping condition, showing a general case for the location of the synthetic scanning point.

As is pictorially illustrated in FIG. 1, a single aircraft, generally designated A, flies over terrain to be mapped and, while thus flying, emits radiation, such as radar radiation. That radiation strikes the terrain below, some of it is reflected therefrom back to the aircraft A, and the reflected radiation is there detected and analyzed, all in essentially conventional manner. If a second aircraft, shown in broken lines and generally designated B, were flying along with the aircraft A at a known position relative thereto and simultaneously scanning the same area of terrain as is being scanned by the aircraft A, the information derived from the radar scan of the aircraft B could be combined with the information derived from the radar scan of aircraft A in order to produce a stereoscopic or three-dimensional representation of the terrain, in much the same manner as stereoscopic photographic mapping is now carried out. Of course, in such a two-plane procedure any variations in the relative positions of the two planes A and B would have to be taken into account, or the accuracy of the produced three-dimensional representation would suffer correspondingly. Within limits, the greater the separation between the aircraft A and B, the greater would be the three-dimensional effect produced.

In accordance with the present invention a system has been devised by means of which, utilizing only the aircraft A, an accurate three-dimensional representation of the terrain can be produced. This is done by synthesizing, from the intelligence derived from the radar scan of plane A, that intelligence which would be derived from a simultaneous radar scan of the same portion of the terrain from an imaginary plane B, where the imaginary relative location of plane B with respect to plane A is not only accurately fixed and unvariable during the mapping operation, but may be readily selected to produce an optimum three-dimensional effect for a given application.

FIG. 2 shows the geometry involved in the derivation of the synthetic stereoscopic display. The aircraft is assumed located in a coordinate system whose origin lies vertically below the aircraft on an arbitrary horizontal $x$—$y$ plane. Thus the aircraft location A is defined by the coordinates $(0, 0, h_1)$, where $h_1$ represents the aircraft altitude above the reference plane. The orientation of the perpendicular $x$ and $y$ axes is arbitrary and may be chosen for convenience. Thus the $x$ axis may represent true North for a weapons system with a capability for determining this direction, may represent magnetic North if the over-all system does not contain automatic means for determining deviation, or may represent either the aircraft's heading or its ground track. A study of the individual system application will invariably lead to a specification for the optimum method of reference axis selection, but this is not particularly relevant to the geometric problem now under consideration.

Assume that the point P represents a particular target from which a return has been obtained. P has the general, and as yet unkonwn, coordinates $(x_P, y_P, z_P)$. The range from A to P, designated by $r$, is obtained from the radar return. In addition, the instantaneous antenna direction is available either in the form of an azimuth angle $\alpha_A$ and a depression angle $\gamma_A$, or else in terms of the coordinates $x_A$ and $y_A$ of a point $P_A$ which lies at the intersection with the reference $(x$—$y)$ plane of the line of sight from A to P.

The display obtained from aircraft location A, of which the return from point P is part, forms one-half of the desired stereoscopic pair. It is now necessary to synthesize the display which would be obtained from a different aircraft location B without, however, making it necessary for the aircraft to physically reach point B. In the most general case point B may be located anywhere at all, with only the restriction that the stereoscopic pair to be obtained from points A and B should eventually permit the derivaion or visualization of the desired topographic target information. Let point B be specified by the general coordinates $(x_2, y_2, h_2)$.

The synthetic line of sight ray from B to P must now be specified. Once more this may be accomplished either in terms of angles $\alpha_B$ and $\gamma_B$ or in terms of the coordinates $(x_B, y_B)$ which define the point $p_B$ that lies on the line of sight and in the reference plane. The known quantities, namely the locations of A, of B, of the range from A to B, and of either the two angles or the two scalar measurements, is sufficient to lead to the complete specification of data for the synthetic display that would be obtained were the aircraft to move to point B.

The following mathematical analysis is applicable.

Equation of line through A and $P_A$:

$$x/x_A = y/y_A = (h_1-z)/h_1 \qquad (1)$$

(Distance from A to P)$^2 = r^2$:

$$r^2 = x_P^2 + y_P^2 + (h_1-z_P)^2 \qquad (2)$$

At P, $x=x_P$, $y=y_P$, and $z=z_P$; hence (1) becomes $$x_P/x_A = y_P/y_A = (h_1-z_P)/h_1 \qquad (3)$$

Solving (3) for $y_P$ and $z_P$ in terms of $x_P$:

$$y_P = x_P y_A / x_A \qquad (4)$$

$$z_P = h_1 - (h_1 x_P / x_A) \qquad (5)$$

Substituting (4) and (5) in (2):

$$r^2 = x_P^2 + (x_P^2 y_A^2 / x_A^2) + (h_1^2 x_P^2 / x_A^2)$$

$$r^2 = (x_P^2 / x_A^2)(x_A^2 + y_A^2 + h_1^2) \qquad (6)$$

Solving (6) for $x_P$ and substituting the result in (4) and (5):

$$x_P = K_1 r x_A \qquad (7)$$

$$y_P = K_1 r y_A \qquad (8)$$

$$z_P = h_1 - K_1 r h_1 \qquad (9)$$

where $$K_1 = 1/\sqrt{x_A^2 + y_A^2 + h_1^2} \qquad (10)$$

NOTE.—Equations 7, 8, and 9 have a direct application in a data reduction system where it is desired to obtain target coordinates directly, i.e., without prior resort to a stereoscopic display.

Equation of line through B and P:

$$(x-y_2)/(x_P-x_2) = (y-y_2)/(y_P-y_2)$$
$$= (z-h_2)/(z_P-h_2) \qquad (11)$$

In the reference plane, $x=x_B$, $y=y_B$, and $z=0$; hence (11) becomes:

$$(x_B-x_2)/(x_P-x_2) = (y_B-y_2)/(y_P-y_2)$$
$$= h_2/(h_2-z_P) \qquad (12)$$

Solving (12) for $x_B$ and $y_B$:

$$x_B = x_2 + h_2(x_P-x_2)/(h_2-z_P) \qquad (13)$$

$$y_B = y_2 + h_2(y_P-y_2)/(h_2-z_P) \qquad (14)$$

Substituting (7), (8), and (9) in (13) and (14):

$$x_B = x_2 + h_2(K_1 r x_A - x_2)/(h_2-h_1+K_1 r h_1) \qquad (15)$$

or $$x_B = x_2 + h_2(r x_A - K_2 x_2)/(h_2 K_2 - h_1 K_2 + r h_1) \qquad (16)$$

or $$y_B = y_2 + h_2(K_1 r y_A - y_2)/(h_2 - h_1 + K_1 r h_1) \quad (17)$$

or $$y_B = y_2 + h_2(r y_A - K_2 y_2)/(h_2 K_2 - h_1 K_2 + r h_1) \quad (18)$$

where $$K_2 = 1/K_1 = \sqrt{x_A^2 + y_A^2 + h_1^2} \quad (19)$$

Through similar analysis, it can be shown that for mixed linear and angular meansurements:

$$x_B = x_2 + h_2(r \sin \alpha_A \cos \gamma_A - x_2)/(h_2 - h_1 + r \sin \gamma_A) \quad (20)$$

$$y_B = y_2 + h_2(r \cos \alpha_A \gamma_A - y_2)/(h_2 - h_1 + r \sin \gamma_A) \quad (21)$$

and for angular measurments:

$$\tan \alpha_B = -(r \sin \alpha_A \cos \gamma_A - x_2)/(r \cos \alpha_A \cos \gamma_A - y_2) \quad (22)$$

$$\tan \gamma_B = \frac{-(h_2 - h_1 + r \sin \gamma_A)}{\sqrt{(r \sin \alpha_A \cos \gamma_A - x_2)^2 + (r \cos \alpha_A \cos \gamma_A - y_2)^2}} \quad (23)$$

These equations are somewhat complex for a high speed solution which would be required, for example, if it were desired to obtain a real time stereo display for immediate use by a pilot or navigator. Some degree of simplification, without any actual compromise in operational utility, may be obtained by consideration of the geometry of "Special Case I," illustrated in FIG. 3.

Figures 3, 4:
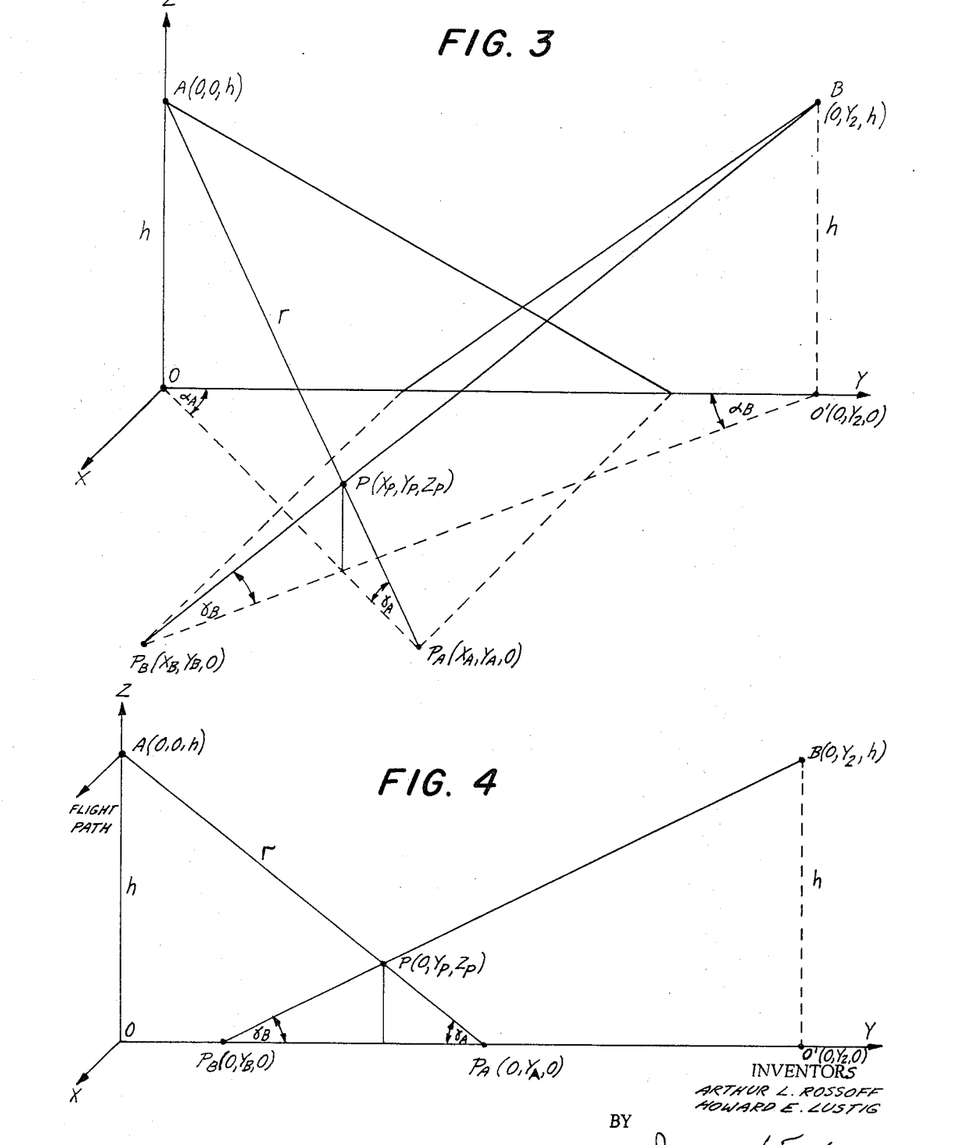
FIG. 3 is a view similar to FIG. 2 but illustrating "Special Case I," in which the synthetic observation point is defined as being at the same elevation and lying in the same vertical plane, perpendicular to the $x$ axis, as the real observation point.
FIG. 4 is a view similar to FIG. 3 but illustrating "Special Case II," in which, in addition to the limitations involved in "Special Case I," all targets scanned during a given cycle lie in a vertical plane perpendicular to the aircraft heading.

Here, point B, the simulated or synthetic aircraft position, is chosen so that it lies at the same elevation as point A, the actual position. This represents no constraint since, for aerial photography, every attempt is made to maintain a true horizontal flight line. Any failure to achieve this objective does, in fact, make the ensuing stereogrammetric operations more complex. In addition to the altitude condition, point B is restricted to lie in the same vertical plane, perpendicular to the x axis, as point A.

For the case where the x axis represents the flight line, this corresponds to the effect that would be achieved if two aircraft flew side by side with an absolutely constant separation between them and took pictures at the exact same instants of time. Once more this results in a highly desirable simplification of stereogrammatic setup and data reduction procedures.

In terms of the mathematic derivations previously set forth, the simplifications involved in Special Case I involve the relationships $$h_1 = h_2 = h \quad (24)$$

and $$x_2 = 0 \quad (25)$$

from which it may be shown that:

(A) For linear measurments—

$$x_B = x_A \quad (26)$$

$$y_B = y_2 + y_A - (y_2/r)\sqrt{x_A^2 + y_A^2 + h^2} \quad (27)$$

(B) For mixed linear and angular measurements—

$$x_B = h \sin \alpha_A / \tan \gamma_A \quad (28)$$

$$y_B = y_2 + (h \cos \alpha_A / \tan \gamma_A) - (h y_2 / r \sin \gamma_A) \quad (29)$$

(C) For angular meansurements—

$$\tan \alpha_B = -(r \sin \alpha_A \cos \gamma_A)/(r \cos \alpha_A - \cos \gamma_A - y_2) \quad (30)$$

$$\tan \gamma_B = \frac{-r \sin \gamma_A}{\sqrt{(r \sin \alpha_A \cos \gamma_A)^2 + (r \cos \alpha_A \cos \gamma_A - y_2)^2}} \quad (31)$$

Additional simplifications are possible for "Special Case II," shown in FIG. 4, which illustrates the application of the radar stereo principle to side-looking radar installations. Here the conditions of Special Case I apply and, in addition, all targets being scanned during one scan cycle lie in a vertical plane perpendicular to the aircraft heading. The additional scan dimension is introduced by the forward motion of the aircraft in conjunction with suitable storage devices for recording or display purposes.

In terms of the mathematical derivations previously set forth, the simplifications involved in Special Case II include that of Equation 24, and the relationship $$x_A = x_2 = \alpha_A = \alpha_B = 0 \quad (32)$$

from which it may be shown that:

(A) For linear measurements—

$$x_B = 0 \quad (33)$$

$$y_B = y_2 + y_A - (y_2/r)\sqrt{y_A^2 + h^2} \quad (34)$$

(B) For mixed linear and angular measurements—

$$x_B = 0 \quad (35)$$

$$y_B = y_2 + (h/\tan \gamma_A) - (h y_2/r \sin \gamma_A) \quad (36)$$

(C) For angular measurements—

$$\tan \alpha_B = 0 \quad (37)$$

$$\tan \gamma_B = -r \sin \alpha_A/(r \cos \gamma_A - y_2) \quad (38)$$

The greatest simplifications may be obtained for "Special Case III," which is identical to "Special Case I," except that the field of view of the radar is limited. When it is the purpose of the three-dimensional display to provide rapid visualization to a pilot, navigator, or other operator, it is not necessary to perform computations with the same precision that is needed, for example, in reconnaissance mapping.

Let us assume that the field of view of the radar is narrow, that is to say, that $\gamma_A$ is near 90°.

Let $\beta_A = 90 - \gamma_A$, i.e. the angle between the vertical axis and the line of sight to the target.

Let $2\psi$ = the total field of view angle.

The maximum value of $\beta_A$ within the field of view is then $\varphi$ and the minimum value is 0.

The term $$T = \sqrt{x_A^2 + y_A^2 + h^2} \quad (39)$$

occurs in Equation 27. This may be rewritten as $$T = h\sqrt{(x_A^2/h^2) + (y_A^2/h^2) + 1} \quad (40)$$

since $$x_A \text{ max.} = y_A \text{ max.} = h \tan \psi \quad (41)$$

and $$x_A \text{ min.} = y_A \text{ min.} = 0 \quad (42)$$

it follows that $$T_{max.} = h\sqrt{(h^2 \tan^2 \psi/h^2) + (h^2 \tan^2 \psi/h^2) + 1}$$
$$= h\sqrt{1 + 2 \tan^2 \psi} \quad (43)$$

$$T_{min.} = h \quad (44)$$

Consider the approximation $$T \approx T' = ch \quad (45)$$

where c is a constant.

The fractional error in the approximation is then given by $$\epsilon = (T - T')/T \quad (46)$$

Suppose C is set equal to 1.0, then $T' = h = T_{min.}$, there is no error at the vertical axis, and the maximum error is given by $$\epsilon_{max.} = (T_{max.} - T')/T_{max.} = 1 - 1/\sqrt{1 + 2 \tan^2 \psi} \quad (47)$$

The table below shows the field of view angles at which given error percentages are reached.

Percent: Field of view (2)
1 .................................................. 11°30'
2 .................................................. 16°20'
3 .................................................. 20°10'
4 .................................................. 23°18'
5 .................................................. 26°10'
6 .................................................. 29°20'

A better approximation is obtained by choosing $c > 1.0$. In this manner the error can be "split," i.e. made negative when $T = T_{min}$, positive when $T = T_{max}$, and zero at some intermediate value. Thus if $T' = 1.04h$ $\epsilon = -4\%$ at the vertical axis
$\epsilon = 0$ at $\beta_A = 11°25'$
$\epsilon = +4\%$ at $2\psi = 32°50'$ Thus an error which does not exceed 4% can be achieved for a field of view of about 33°. The table below lists the limiting values of $2\psi$ which result in a given error split with respect to the vertical axis.

| c | ε at vertical (percent) | ε at 2ψ (percent) | Field of view |
|---|---|---|---|
| 1.01 | −1 | 1 | 16°16' |
| 1.02 | −2 | 2 | 23°04' |
| 1.03 | −3 | 3 | 28°20' |
| 1.04 | −4 | 4 | 32°50' |
| 1.05 | −5 | 5 | 36°50' |
| 1.06 | −6 | 6 | 40°28' |

With these approximations, Equation 18a reduces to the form:

$$y_B = y_2 + y_A - cy_2h/r \quad (48)$$

Equation 48 shows that the synthesis process consists simply of a translation of the existing $y_A$ value along the $y$ axis by an amount which is equal to the sum of a constant ($y_2$) plus another constant ($cy_2h$) divided by the range to the target. Thus the "computation" degenerates into a simple transformation involving an inverse function generator. This is the simplest implementation of the stereo system, yet it is quite adequate for display purposes where visualization, rather than detailed mapping, is the objective.

Depending upon the choice of $c$, the maximum error introduced by the approximation may be kept reasonably small for a narrow angle field of view. Thus if $c$ is taken as 1.0, a field of view as great as 26° may be accommodated with an error ranging from 0 to 5%. If $c$ is made equal to 1.04, a field of view of 34° results in errors always less than ±4%. The errors discussed here apply to the term containing $c$ with respect to the term containing the square root, not to the total error in the computation of $y_B$. The latter error depends, in addition, on the ratio of the aircraft altitude above the reference plane to the elevation of the target above this plane. The larger this ratio, the less the error. For typical aircraft altitudes and terrain elevation variations, the error in the resulting $y_B$ is approximately equal to the error in the term containing $c$.

Similar approximations may be applied to the trigonometric equations of Special Case I. Here too, a significant reduction of computation complexity may be achieved.

Systems of the type here under discussion may be used in a wide variety of applications. The first general class of applications is that where immediate display of a stereoscopic radar pair is desired. The general use for such a display is to provide a three-dimensional view of terrain to a pilot, navigator, or other equipment operator. The display has obvious increased utility with respect to a single PPI display in terms of improved terrain visualization. It may therefore be used for navigation, reconnaissance, or bombardment functions much in the manner of visual contact with the terrain, except with the increased utility of essentially all-weather operation and control of vertical exaggeration.

Implementation of an immediate viewing equipment requires, in addition to the radar itself, the processes of computation, storage, and display. The computation is performed most readily by a combination of electronic and electromechanical analog techniques. Digital computation techniques are also entirely feasible. For the present application, however, the relative simplicity of the analog computation leads to a smaller package than would a digital equipment. As a result, digital computation would be used only if additional computer functions had to be performed in the aircraft for other purposes, such as navigation and fire control, and if a digital facility already existed for these purposes. A limited storage facility is required since it is desired to present complete frames for viewing. Since information is gathered on a point by point basis, the storage facility must be sufficient to assemble complete frames from their point by point constituents and to retain the image for a period sufficiently long to complete the viewing operation. Present day high resolution storage-display tubes can be adapted to perform both the storage function and the subsequent display. The display itself can utilize either one or two tubes, depending on whether the stereo image is to be created by opto-mechanical techniques, the use of color, or polarization, all of which techniques are known.

It should be noted that implementation of a computer for direct viewing purposes only is less complex and poses fewer problems than is the case for the applications to be described subsequently. This results from the fact that immediate viewing, for the purpose of obtaining a three-dimensional visualization, does not require the computing accuracy necessary for the other applications. The consequent waiver of a high precision requirement makes it possible to utilize several approximations and thereby to reduce computer complexity and to permit the use of less expensive computer components.

In other applications of the stereo radar system immediate viewing of the type just described is of little consequence, but it is desired, instead, to accumulate precise stereoscopic data for subsequent detailed analysis. For example, reconnaissance missions as well as mapping and charting operations belong to this application category.

The basic implementation requirements for these applications are identical in that, in addition to the radar itself, means must be provided for computation and data storage. The computation must now be carried out with a high degree of precision and therefore implies a greater degree of complexity than was required for immediate viewing. Storage considerations are also different, since a permanent record suitable for subsequent use is required in contrast to a short term storage facility for viewing a single stereo pair only.

A number of different storage means can be provided. The first of these records complete radar stereo PPI pairs on film. One of the PPI's is the actual one obtained at the aircraft location, while the other is the corresponding synthetic presentation, generated in real time by the computer. In addition, it would be desirable to store, on the same film, such navigational information, useful for later data reduction or interpretation, as may be available from other equipment carried in the aircraft. The resulting film record is then suitable for direct use in stereogrammetric plotting equipment, where it serves as the source material for the compilation of topographic maps. As mentioned above, the plotting equipment can be greatly simplified and its operating complexity greatly reduced, since it is possible to generate the synthetic signal so that an absolutely constant separation is maintained between the actual and synthetic exposure points and so that the elevations of the two points above the reference plane are identical.

Figure 5:
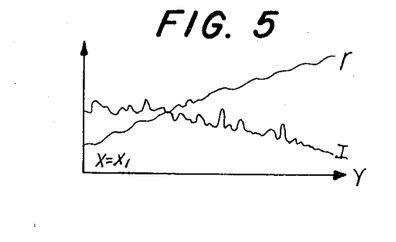
FIGS. 5 and 6 are typical representations of recordings respectively of received and derived data obtained as a result of the instant invention.
Figure 6:
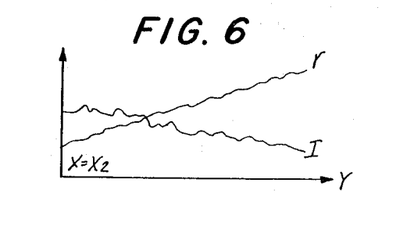

Storage on magnetic tape or on film, but in a different form than described above, is also feasible. Four parameters are necessary to describe the information contained in any one frame. These are the two linear or angular measurements which define the line of sight direction to the target, the target range, and the intensity of the return. Either magnetic tape or film may be used to record these parameters in one of several fashions. Consider, for example, a radar search pattern which is similar to a television raster. The $x$ direction, representing the flight direction, is scanned slowly, while the $y$ direction is traversed relatively rapidly. In the aircraft, the $y$ scan may be either linear or non-linear with time but is, in any event, uniquely related to time in a known fashion. It is therefore possible to produce a dual-trace recording such as is indicated by FIGS. 5 and 6, which is similar to an A-scope presentation. The $y$ direction of the scan is generated by time and successive $y$ traces are identified by simultaneous recording of the then existing $x$ measurement. One of the dual traces is used to indicate range to the targets ($r$) as a function of $y$, the other one to display intensity (I).

Recordings of this type may be made either for the live radar channel only, or else for both the live and the synthetic channel. This method of recording makes it possible to perform the stereo computation after the aircraft has returned to the ground, yet reduces the data to a form which is suitable for automatic high speed readout and computation. If the computation is to be performed on the ground, then it is, of course, necessary to store only the live channel information. A number of pre-computations may, however, be performed in the aircraft prior to recording. Thus the target $z$ coordinates may be computed and stored in lieu of the ranges. Alternatively, the target coordinates given by Equations 7, 8, and 9 (or of simplified forms thereof for the special cases) may be computed and stored. The latter method can result in a direct terrain profile recording which, during ground processing, can be used for direct printout of a topographic contour map.

While the emphasis of this discussion has been placed on applications of ground surveillance from an aircraft, this restriction does not apply to the basic concept. The system may be used with equal utility to provide three-dimensional visualization, such as might be desired for traffic control of aircraft as seen from ground or ship-based installations. Stereo ground coverage for an aircraft in a landing approach, using simple corner reflectors to define runways, is another of several possible applications. The same considerations could be used for radiation mapping of the sea bottom from shipborne installations, for example.

The various computations may be performed both with analog devices or with digital computers. The degree of complexity required is such that implementation of a digital computer to serve only the indicated functions appears wasteful in terms of cost as well as equipment size. A digital computer could readily be used, however, if it already exists in the aircraft for other purposes and if it has the general purpose facility required for this application. The following discussion will concentrate on analog methods but is not intended to rule out the possibility of digital implementation.

The implementation of Special Case I is discussed below as an example of a relatively complex type of instrumentation. This implementation is to be considered as typical rather than as definitive.

Figure 7:
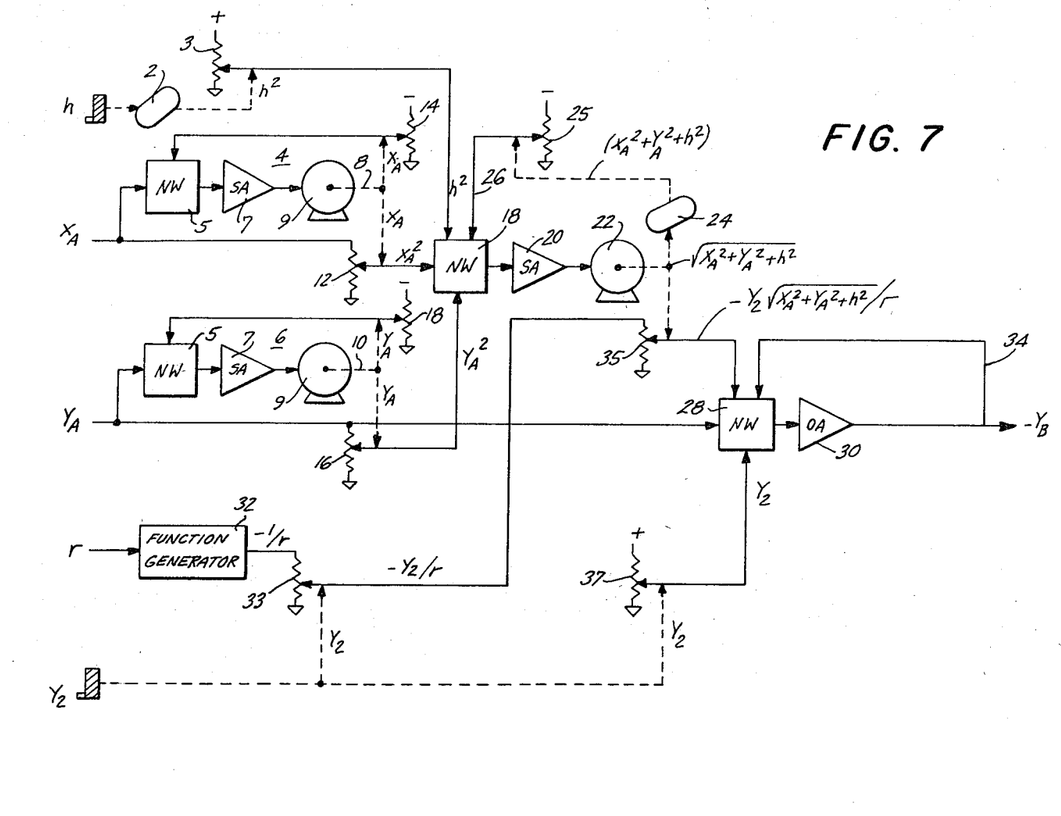
FIG. 7 is a schematic view of a computational system for use with "Special Case I," as illustrated in FIG. 3.

A direct approach to the mechanization is indicated in FIG. 7. The equation to be solved for $y_B$ in this case may be written as:

$$y_2+y_A-y_B=(y_2/r)\sqrt{x_A^2+y_A^2+h^2} \qquad (27a)$$

It is assumed that the constants $h$ and $y_2$ are inserted mechanically by an operator; $x_A$ and $y_A$ are assumed to be available in electrical form as outputs from the antenna scan system. The range $r$ is assumed to be available in electrical form from the radar output.

It is first necessary to produce the three squared quantities whose sum is eventually to be square rooted. The square of $h$, a mechanical quantity, is readily generated by a squaring cam 2 and potentiometer 3, as indicated in FIG. 7 or else by means of a non-linearly calibrated dial (see part 36 of FIG. 8). $x_A^2$ and $y_A^2$ are easily obtained with servosystems 4 and 6 respectively, comprising networks 5, servoamplifiers 7 and servomotors 9, since they are quantities that vary relatively slowly and at a predictable time rate. In each case the input quantity is servoed to provide a mechanical shaft output at 8 and 10 respectively, which is used in turn, to position potentiometers 12, 14 and 16, 18 respectively. The excitations of potentiometers 12 and 16 are portional to the quantities $x_A$ and $y_A$ respectively. The electrical output at the wiper arms of potentiometers 12 and 16 are, therefore, the squared quantities involved, $x_A^2$ and $y_A^2$ respectively.

The quantities $h^2$, $x_A^2$, and $y_A^2$ are now available as electrical quantities and are inserted into a network box-amplifier combination 18, 20 for the addition operation. The output of the servomotor 22 driven thereby is then equal to the square root of the sum of the squares, provided that this output is first squared, by squaring cam 24, in order to generate, at the potentiometer 25, the feedback voltage 26 which zeroes the servo system. The quantities $y_A$, $y_2$ and $-y^2\sqrt{x_A^2+y_A^2+h^2}/r$ are then introduced to another network box 28 operating in conjunction with an operational amplifier 30. The quantity $1/r$ is needed as part of this operation and is generated by a function generator 32 whose input is $r$ and which energizes potentiometer 33, the wiper arm of which is positioned in accordance with $y_2$. The output of potentiometer 33 energizes potentiometer 35, the wiper arm of which is positioned by the output of servomotor 22. The $y_2$ input to network 28 is provided by potentiometer 37. The combination of network 28 and computing amplifier 30 produces an output corresponding to $-y_B$. The feedback 34 is provided, in accordance with conventional techniques, to ensure that variations in the gain of amplifier 30 will not affect the value of output $-y_B$.

Figure 8:
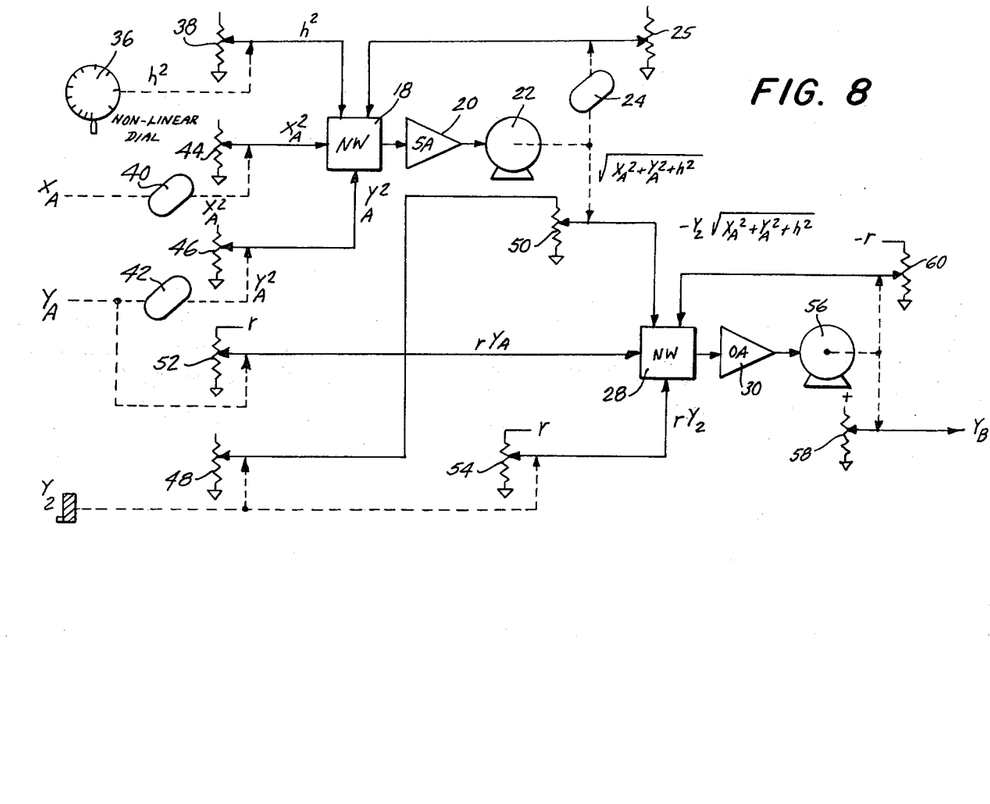
FIG. 8 represents an alternative arrangement of such a computational system.

A simplified mechanization is shown in FIG. 8. Here the squared quantities are generated in more straight-forward fashion by assuming that $h$, $x_A$, $y_A$, and $y_2$ are available as mechanical quantities. Equation 27 is first rearranged to give $$r(y_2+y_A-y_B)=y_2\sqrt{x_A^2+y_A^2+h^2} \qquad (27b)$$

$h^2$ is mechanically derived directly through the appropriately calibrated non-linear dial 36, thereby to produce a corresponding output from the potentiometer 38. The values for $x_A$ and $y_A$ are derived from squaring cams 40 and 42 respectively, producing corresponding electrical outputs from potentiometers 44 and 46 respectively. The square root of the sum of the squares is produced as in FIG. 7, from network 18, servoamplifier 20, servomotor 22, squaring cam 24 and potentiometer 25. The $y_2$ input controls potentiometer 48, the electrical output of which energizes potentiometer 50, the wiper arm of which is positioned by the output of servomotor 22. An electrical input corresponding to $r$ energizes potentiometer 52, the wiper arm of which is positioned in accordance with $y_A$, and also energizes potentiometer 54, the wiper arm of which is positioned in accordance with $y_2$. The outputs from potentiometers 50, 52 and 54 are fed to network 28 and operational amplifier 30, the latter driving servomotor 56, which in turn positions the wiper arms of output potentiometer 58 and feedback potentiometer 60, the latter being energized by a signal corresponding to $-r$. The output of the system will be $y_B$. It will be noted that the system of FIG. 8 eliminates the need for the function generator 32 and for the servosystems 4 and 6 of the system of FIG. 7.

As set forth above, method and means have been disclosed for deriving information from a radar signal corresponding to the viewing of terrain beneath a moving aircraft, for creating from that information synthetic information such as would be received from radar carried in a second aircraft moving with but separated from the first plane, the real and the synthetic signal then being combined in any one of a variety of ways in order to produce a three-dimensional representation of that which is "seen" from but a single point of observation. A plurality of different systems have been disclosed embodying different assumptions on the basis of which the synthetic signal is created, these several systems being adaptable for different uses or applications.

It will be apparent that many variations may be made in the specific methods and systems here disclosed without departing from the spirit of the invention as defined in the following claims. It will further be apparent that while the invention has been here specifically disclosed in connection with radar mapping, from an aircraft, of terrain over which the aircraft is flying, the invention is not limited thereto but is applicable to systems utilizing types of radiation other than radar, emanating from places other than aircraft, and used for producing three-dimensional representations of objects other than features of terrain.

We claim:

1. In apparatus for producing a three-dimensional target representation from a single radiation detector which comprises means for deriving, from the real radiation signal emanating from said target and indicating the location of said target relative to said detector, a synthetic signal corresponding to the location of said target relative to a point spaced from said detector in a predetermined manner, the imaginary line of sight from said spaced point through said target intersecting a reference plane at the XY coordinates $x_B$ and $y_B$ respectively, said detector being at an $x=0$, $y=0$ position and an altitude of $h$ above said reference plane, said spaced point being at an $x=0=x_A=x_B$, $y=y_2$ position and an altitude of $h$ above said reference plane, $r$ being the range of the target from said detector, and $x_A$ and $y_A$ being the coordinates of the intersection with said reference plane of the line of sight from said detector to said target, and stereoscopically combining said real and synthetic signals; the improvement which comprises said means for deriving said synthetic signal comprising inputs for $h$, $y_A$, $r$ and $y_2$, and further comprising means for generating a first electrical signal corresponding to $h^2$, a second electrical signal corresponding to $y_A$, a third electrical signal corresponding to $y_A^2$, a fourth electrical signal corresponding to $y_2$, and a fifth electrical signal corresponding to $-y_2/r$, means for adding said first and third signals to produce a sixth signal, means for feeding said sixth signal to a feedback servosystem the output of which, defining a seventh signal, is squared before it is fed back, means for multiplying said fifth and seventh signals to produce an eighth signal, means for adding said second, fourth and eighth signals, and means for driving a feedback servo system from the output of said last mentioned means to produce an output corresponding to $y_B$, where $y_B$ equals $y_2 + y_A - (y_2/r)(y_A^2 + h^2)^{1/2}$.

2. The computing assembly of claim 1, in which said fifth signal is produced by deriving a signal corresponding to $-1/r$ and multiplying it by said fourth signal.

3. In apparatus for producing a three-dimensional target representation from a single radiation detector which comprises means for deriving, from the real radiation signal emanating from said target and indicating the location of said target relative to said detector, a synthetic signal corresponding to the location of said target relative to a point spaced from said detector in a predetermined manner, the imaginary line of sight from said spaced point through said target intersecting a reference plane at the XY coordinates $x_B$ and $y_B$ respectively, said detector being at an $x=0$, $y=0$ position and an altitude of $h$ above said reference plane, said spaced point being at an $x=0=x_A=x_B$, $y=y_2$ position and an altitude of $h$ above said reference plane, $r$ being the range of the target from said detector, and $x_A$ and $y_A$ being the coordinates of the intersection with said reference plane of the line of sight from said detector to said target, and stereoscopically combining said real and synthetic signals; the improvement which comprises said means for deriving said synthetic signal comprising inputs for $h$, $y_A$, $r$ and $y_2$ and further comprising means for generating a first electrical signal corresponding to $h^2$, a second electrical signal corresponding to $y_A^2$, a third electrical signal corresponding to $ry_A$, a fourth electrical signal corresponding to $ry_2$, a fifth electrical signal corresponding to $r$, and a sixth electrical signal corresponding to $y_2$, means for adding said first and second signals to produce a seventh signal, means for feeding said seventh signal to a feedback servosystem the output of which, defining an eighth signal, is squared before it is fed back, means for multiplying said sixth and eighth signals to produce a ninth signal, means for adding said third, fourth and ninth signals to produce a tenth signal, and means for feeding said tenth signal to a feedback servosystem the output of which, corresponding to $y_B$ is multiplied by the negative of said fifth signal before it is fed back, where $y_B$ equals $y_2 + y_A - (y_2/r)(y_A^2 + h^2)^{1/2}$.

4. The computing assembly of claim 3, in which said third and fourth signals are produced by multiplying said second and sixth signals respectively by said fifth signal.

5. In apparatus for producing a three-dimensional target representation from a single radiation detector which comprises means for deriving, from the real radiation signal emanating from said target and indicating the location of said target relative to said detector, a synthetic signal corresponding to the location of said target relative to a point spaced from said detector in a predetermined manner, the imaginary line of sight from said spaced point through said target intersecting a reference plane at the XY coordinates $x_B$ and $y_B$ respectively, said detector being at an $x=0$, $y=0$ position and an altitude of $h$ above said reference plane, said spaced point being at an $x=0$, $y=y_2$ position and an altitude of $h$ above said reference plane, $r$ being the range of the target from said detector, and $x_A$ and $y_A$ being the coordinates of the intersection with said reference plane of the line of sight from said detector to said target, and stereoscopically combining said real and said synthetic signals; the improvement which comprises said means for deriving said synthetic signal comprising inputs for $h$, $x_A$, $y_A$, $r$ and $y_2$, and further comprising means for generating a first electrical signal corresponding to $h^2$, a second electrical signal corresponding to $x_A^2$, a third electrical signal corresponding to $y_A$, a fourth electrical signal corresponding to $y_A^2$, a fifth electrical signal corresponding to $y_2$, and a sixth electrical signal corresponding to $-y_2/r$, means for adding said first, second and fourth signals to produce a seventh signal, means for feeding said seventh signal to a feedback servosystem, the output of which, defining an eighth signal, is squared before it is fed back, means for multiplying said sixth and eighth signals to produce a ninth signal, means for adding said third, fifth and ninth signals, and means for deriving a feedback servosystem from the output of said last mentioned means to produce an output corresponding to $y_B$, where $y_B$ equals $x_A$ equals $$y_2 + y_A - (y_2/r)(x_A^2 + y_A^2 + h^2)^{1/2}$$

6. The computing assembly of claim 5, in which said sixth signal is produced by deriving a signal corresponding to $-1/r$ and multiplying it by said fifth signal.

7. In apparatus for producing a three-dimensional target representation from a single radiation detector which comprises means for deriving, from the real radiation signal emanating from said target and indicating the location of said target relative to said detector, a synthetic signal corresponding to the location of said target relative to a point spaced from said detector in a predetermined manner, the imaginary line of sight from said spaced point through said target intersecting a reference plane at the XY coordinates $x_B$ and $y_B$ respectively, said detector being at an $x=0$, $y=0$ position and an altitude of $h$ above said reference plane, said spaced point being at an $x=0$, $y=y_2$ position and an altitude of $h$ above said reference plane, $r$ being the range of the target from said detector, and $x_A$ and $y_A$ being the coordinates of the intersection with said reference plane of the line of sight from said detector to said target, and stereoscopically combining said real and said synthetic signals; the improvement which comprises said means for deriving said synthetic signal comprising inputs for $h$, $x_A$, $y_A$, $r$ and $y_2$ and further comprising means for generating a first electrical signal corresponding to $h^2$, a second electrical signal corresponding to $x_A^2$, a third electrical signal corresponding to $y_A^2$, a fourth electrical signal corresponding to $ry_A$, a fifth electrical signal corresponding to $ry_2$, a sixth electrical signal corresponding to $r$, and a seventh electrical signal corresponding to $y_2$, means for adding said first, second and third signals to produce an eighth signal, means for feeding said eighth signal to a feedback servosystem the output of which, defining a ninth signal, is squared before it is fed back, means for multiplying said seventh and ninth signals to produce a tenth signal, means for adding said fourth, fifth and tenth signals to produce an eleventh signal, and means for feeding said eleventh signal to a feedback servosystem the output of which, corresponding to $y_B$, is multiplied by the negative of said sixth signal before it is fed back, where $y_B$ equals $x_A$ equals $y_2+y_A-(y_2/r)(x_A^2+y_A^2+h^2)^{1/2}$.

8. The computing assembly of claim 7, in which said fourth and fifth signals a reproduced by multiplying said third signal and said seventh signal respectively by said sixth signal.

References Cited
UNITED STATES PATENTS 2,718,000   9/1955   Sunstein _____________ 343—7.9

MALCOLM A. MORRISON, *Primary Examiner.*

V. SIBER, *Assistant Examiner.*